June 14, 1949.　　　　　S. A. OCHS　　　　　2,472,841
VALVE CONSTRUCTION
Filed Feb. 9, 1945　　　　　　　　　　　　　　2 Sheets—Sheet 1
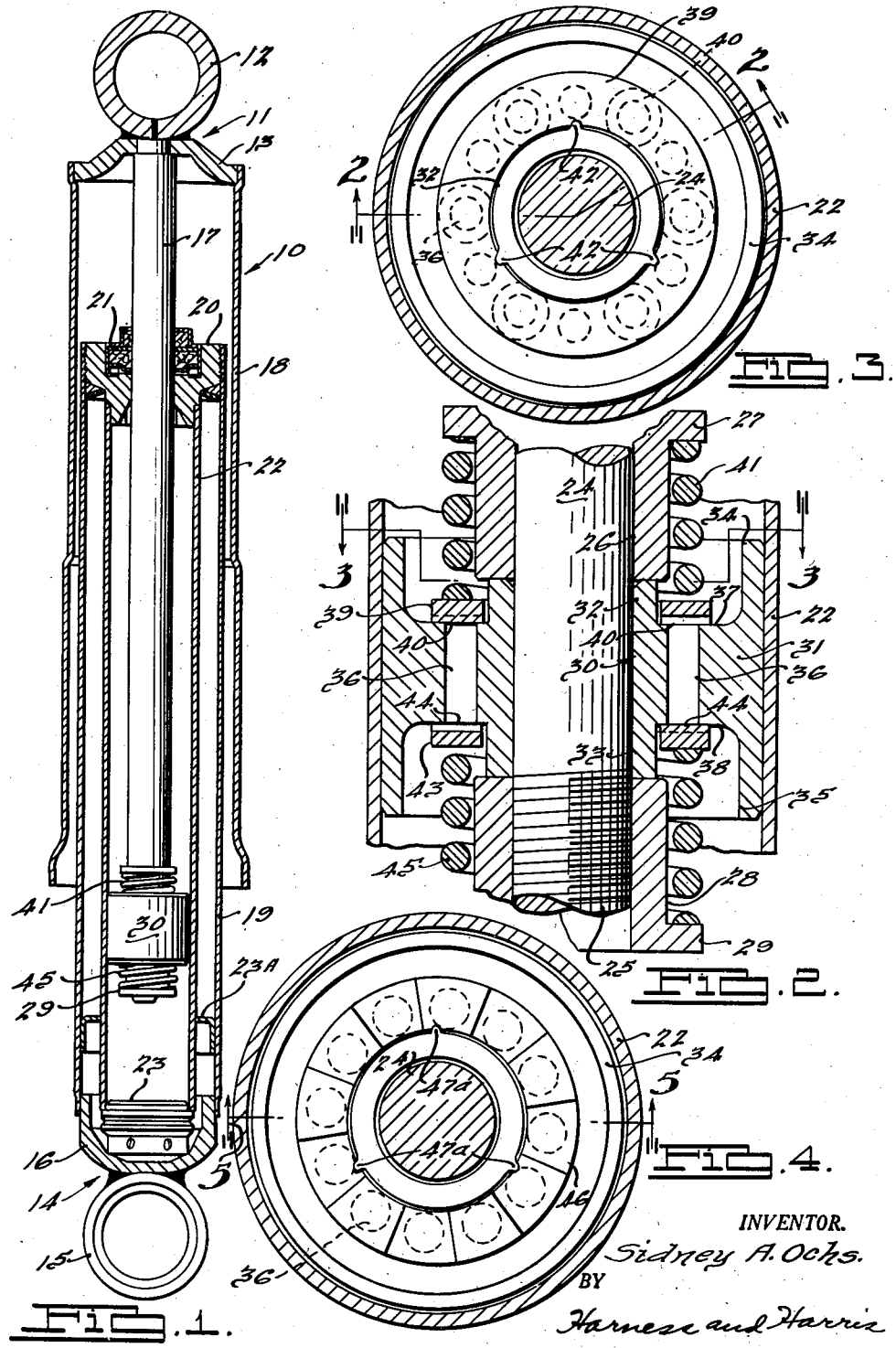
INVENTOR.
Sidney A. Ochs.
BY Harness and Harris
ATTORNEYS.

June 14, 1949.  S. A. OCHS  2,472,841
VALVE CONSTRUCTION
Filed Feb. 9, 1945  2 Sheets-Sheet 2
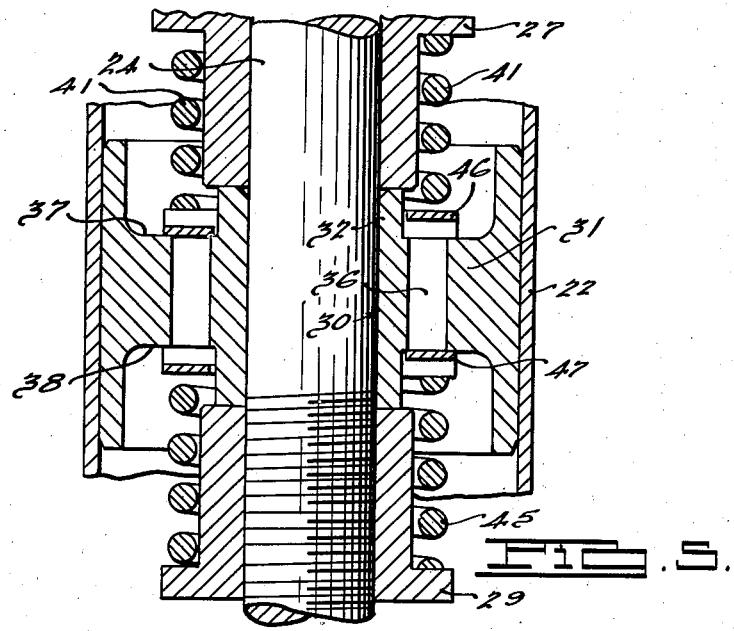
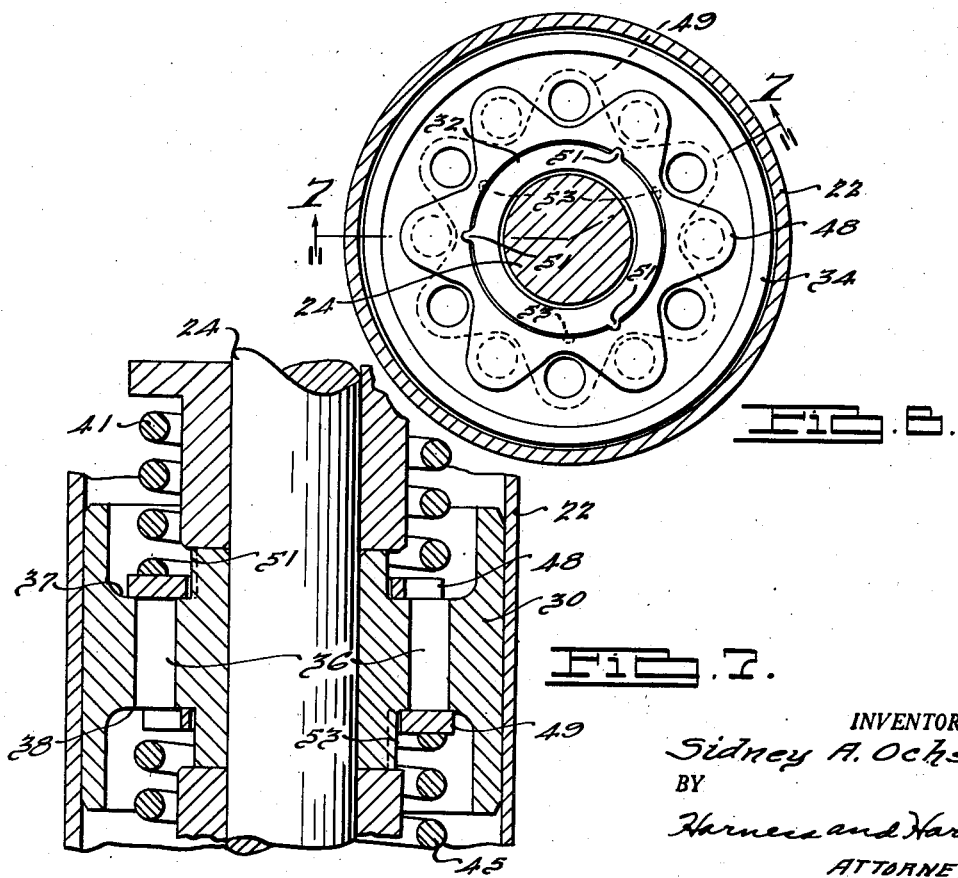
INVENTOR.
Sidney A. Ochs.
BY
Harness and Harris
ATTORNEYS.

Patented June 14, 1949

2,472,841

UNITED STATES PATENT OFFICE 2,472,841

VALVE CONSTRUCTION

Sidney A. Ochs, Detroit, Mich., assignor to Chrysler Corporation, Highland Park, Mich., a corporation of Delaware Application February 9, 1945, Serial No. 577,015

17 Claims. (Cl. 188—100)

This application relates to a valve construction. More specifically it relates to a valved piston intended for use in a shock absorber.

In the case of some valve constructions such as the valves in shock absorber pistons there are employed two valves and two rows of passages for flow in two directions at the same or widely different pressures. Many problems have been encountered in such arrangements, because the employment of two sets of passages in the small space afforded in such a body as a shock absorber piston. I propose to improve the valves closing the passages and thereby to accomplish a simplification of the passages.

An object of the present invention is to provide improvements in a valve construction that is capable of passing fluid in different directions through different sets of passages. These improvements may be applied to pistons of shock absorbers.

Another object is the provision of improvements in valve members cooperating with a valve body for controlling the flow of fluid through passages formed in the valve body.

A further object lies in improving the configuration of valve members for making possible the flow of pressure fluid in different directions through a single ring of passages extending through the valve body.

Other objects will appear from the disclosure.

In the drawings:

Fig. 1 is a longitudinal sectional view of a shock absorber employing a novel valve construction of the present invention;

Fig. 2 is a sectional view taken on the line 2—2 of Fig. 3;

Fig. 3 is a sectional view taken on the line 3—3 of Fig. 2;

Fig. 4 is a sectional view similar to Fig. 3 but of a modified form;

Fig. 5 is a sectional view taken on the line 5—5 of Fig. 4;

Fig. 6 is a sectional view similar to Figs. 3 and 4 but of a second modified form; and Fig. 7 is a sectional view taken on the line 7—7 of Fig. 6.

Reference character 10 designates a shock absorber of the present invention which includes an upper head 11 composed of a ring 12 and a disk 13 and a lower head 14 composed of a ring 15 and a cup 16. The disk 13 is joined to the ring 12 by soldering or welding and has an opening receiving the reduced end of a piston rod 17 in a welded or soldered connection. A tubular sleeve 18 is secured to the disk 13 by soldering or welding. A cup 16 is secured to the ring 15 by soldering or welding, and soldering or welding secures the lower end of a tubular sleeve 19 to the cup 16. The upper end of the sleeve 19 receives a bushing 20 in a threaded connection. The piston rod 17 has a sliding fit in the bushing 20 and is sealed by means of a seal 21 mounted in the bushing 20. The upper end of a sleeve 22 is secured by soldering or welding to the bushing 20, and the lower end is similarly secured to the compression valve structure 23. A baffle 23A is positioned in the space between the tubular sleeves 19 and 22.

The piston rod 17 has at one end a reduced portion 24 having threaded end 25. Mounted upon the reduced portion 24 is a tubular section 26 having at one end a flange 27. A nut 28 having a flange 29 engages the threaded end 25 so as to clamp between itself and the tubular section 27 a piston 30 mounted upon the reduced portion 24 of the piston rod 17. The piston 30 has a body or central portion 31, an upper central hub extension 32 engaging the tubular section 26, a lower central hub extension 33 engaging the nut 28, and upper and lower peripheral skirts 34 and 35. The piston is, of course, slidably mounted in the tubular sleeve 22. The piston has a circular ring of passages 36 extending through the central or body portion 31 thereof from an upper face 37 to a lower face 38. Seated upon the piston face 37 in covering relation with respect to the passages 36 is a valve ring 39 of annular or ring form having circular seating portions 40 projecting from the lower face so as to close the upper ends of alternate passages 36. The seating portions 40 maintain the valve ring 39 in spaced relation with respect to the remaining alternate passages 36. A coil spring 41 acting between the flange 27 on the tubular section 26 and the valve ring 39 yieldingly holds the valve ring 39 in engagement with the face 37 of the piston 30. The upper central hub portion 32 has three keys 42 placed 120° apart, fitting within keyways in the valve ring 39 so as to prevent rotation of the valve ring and thereby to keep the seating portions 40 in closing position with respect to the proper alternate passages 36. The valve ring 39 may be lifted from engagement with the piston face 37 against the action of the spring 41 until it engages the lower end of the tubular section 27. The fit of the valve 39 on the hub portion 32 is sufficiently free to permit the required movement of the valve 39 along the hub portion 32. An annular or ring valve 44 is positioned at the lower piston face 38 in covering relation with respect to the passages 36. The valve 43 has raised circular seating portions 44 similar to the portions 40 of the valve 39 and positioned with respect to one another so as to engage the lower ends of those alternate passages 36 not engaged by the seating portions 40 of the valve 39. The alternate passages 36 engaged by the seating portions 40 of the ring 39 are open at their lower ends because the seating portions 44 of the lower rings 43 do not engage these passages and space the remainder of the valve ring 43 from the lower ends of these passages. A coil spring 45 acting between the flange 29 of the nut 28 and the valve 43 yieldingly holds the valve 43 in engagement with the lower piston face 38. The valve 43 is held against rotation by means of keys upon the lower central hub portion 33, which are not shown but are similar to the keys 42 of the upper central hub portion and have the same purpose as the keys 42. The valve 43 may move down out of engagement with the piston face 38 against the action of the spring 45 until the valve 43 engages the upper end of the nut 29. The fit of the valve 43 on the hub portion 33 is sufficiently free to permit the required movement of the valve 43 along the hub portion 33. The upper face of the valve 39 and the lower face of the valve 43 are planar or continuously flat. The valves may be formed of sintered metal or may be die-cut.

In operation of the shock absorber 10 there is fluid in the tube 22 both above and below the piston 30. When force is applied tending to move the parts between which the shock absorber 10 is connected toward one another, the piston 30 tends to move downwardly in the tube 22. Such downward movement takes place when the pressure of the fluid below the piston 30 is sufficient to raise the valve 39 from seating engagement with the upper piston face 37. Then flow of fluid through the piston takes place past the valves 43 and 39 and through those alternate passages 36 that were closed by the seating portions 40 on the valve 39 before the valve 39 was lifted. When the parts between which the shock absorber 10 is connected tend to move away from one another the piston 30 tends to move upwardly in the tube 22. Such upward movement may take place when the pressure of the fluid above the piston 30 is sufficient to disengage the valve 43 from the lower piston face 38 against the action of the spring 45. Then flow of fluid downwardly through the piston takes place past the valves 39 and 43 and through those passages 36 that were closed by the seating portions 44 of the valve 43 before it was depressed from engagement with the lower piston face 38.

The compression valve 23 is not shown in detail since it forms no part of the present invention. Its purpose is to provide compensation for the difference in the rate of change of volume of fluid above the piston 30 and below the piston. The area for fluid above the piston 30 is less than that below the piston by an amount substantially equal to the cross sectional area of the piston rod 17. Thus as the piston 30 moves downwardly in the tube 22 the volume for fluid above the piston 30 does not increase so rapidly as the volume for fluid below the piston 30 decreases. Consequently there must be a decrease in the total volume of fluid within the tube 22 and this is made possible by the compression valve 23 through which the fluid escapes from the tube 22 to the reservoir between the tubes 13 and 22. When the piston 30 moves upwardly in the tube 22 the volume for fluid below the piston 30 increases more rapidly than the volume for fluid above the piston 30 decreases, and so the total volume for fluid in the tube 22 increases. To accommodate this, the valve 23 permits flow of fluid from the reservoir between the tubes to the space within the tube 22.

The construction of Figs. 4 and 5 differs from that of Figs. 2 and 3 in that there are provided annular corrugated valves 46 and 47 contacting respectively the upper and lower faces 37 and 38 of the piston 30. The corrugated valve 46 closes alternate passages 36 in the piston 30 at their upper ends and is spaced from the remaining alternate passages 36. The valve 47 closes the said remaining alternate passages 36 at their lower ends and is spaced from the first mentioned alternate passages. As the piston 30 moves downwardly in the tube 22 the valve ring 46 is lifted from the piston face 37 against the action of the spring 41. Flow of fluid upwardly through the piston 31 takes place past the valves 46 and 47 and through those passages 36 that were closed by the valve 46 before it was lifted. When the piston 31 is moved upwardly in the tube 22 the valve 47 is taken out of engagement with the lower piston face 38, and flow of fluid takes place downwardly through the piston 30 past the valves 46 and 47 and through those passages 36 that were closed by the valve 47 before it was depressed from engagement with the piston face 38 against the action of the spring 45. Rotative movement of the valve 46 is prevented by three keys 47ª formed on the exterior of the upper hub portion 32 and spaced 120° apart and keyways in the inner periphery of valve 46 receiving keys 47ª. The valve 47 is held against rotative movement by similar means, not shown. The purpose in preventing rotative movement of valves 46 and 47 is to assure proper positioning of the valves for closing the proper alternate passages 36. The fit of the valves 46 and 47 upon the hub portions 32 and 33 is sufficiently loose to permit the required movement of the valves along the hub portions. The construction of Figs. 4 and 5 may be employed in a shock absorber assembly similar to that of Fig. 1. The compression valve 23 may be employed for the purpose described with reference to Figs. 2 and 3.

The construction of Figs. 6 and 7 differs from those of the previous figures in that valves 48 and 49 positioned in engagement with the piston faces 37 and 38 respectively are formed of scalloped rings. The valve 48 has a generally circular inner periphery in which are formed keyways spaced 120° apart and receiving keys 51 formed on the upper central hub 32 of the piston 30. In this way rotational movement of the valve 48 is prevented. The exterior periphery of the valve 48 is scalloped so as to cover and close the upper ends of certain alternate passages 36 in the piston 30. The remaining alternate passages 36 are not covered by the valve 48 and are open at their upper ends. The valve 49 has a circular inner periphery in which are formed three keyways spaced 120° apart and receiving keys 53 formed on the exterior of the lower central hub portion 33 of the piston 30. The purpose of the keys 51 and 53 and the keyways is to prevent rotation of valves 48 and 49 and thereby to assure positioning of the valves for closing the appropriate alternate passages 36. The valve 49 has a scalloped exterior periphery and covers and closes the lower ends of those passages 36 that are not covered at their upper ends by the valve 48. Fig. 6 shows the relative angular positions of the two valves 48 and 49. When the piston 30 moves downwardly in the tube 22 the valve 48 is raised from engagement with the upper piston face 37. Flow of fluid takes place past the valves 48 and 49 and through those passages 36 which were closed by the valve 48 before it was raised from engagement with the piston 37. When upward movement of the piston 30 takes place the valve 49 is depressed from engagement with the piston face 38, and flow of fluid through the piston takes place past the valves 48 and 49 and through those passages 36 that were closed by the valve 49 before it was depressed from engagement with the lower piston face 38. The fit of the valves 48 and 49 upon the hub portions 32 and 33 is sufficiently loose to prevent the required movement of the valves along the hub portions. The construction of Figs. 6 and 7 may be used in a shock absorber assembly like that of Fig. 1. Also the compression valve 23 may be in cooperation with the construction of Figs. 6 and 7 for the purposes described with reference to Figs. 2 and 3.

From the foregoing description it will be evident that there have been described three forms of valve constructions suitable for use in shock absorber pistons. In each form there is provided a single row of passages 36 for the flow of fluid through the piston, one group of passages being employed for flow of fluid through the piston in one direction and the other group being employed for the flow of fluid in the other direction. This is made possible by the use of three different forms of valves cooperating with the passages in the piston to open and close them. It may be stated with respect to each valve that it has reentrant portions that make possible the closing of one end of certain passages and the keeping open of one end of other passages. In the species of Figs. 2 and 3 the reentrant portions are formed between the seats 40 and 44 on the valves 39 and 43, respectively, the portions being reentrant with respect to the seats. In the species of Figs. 4 and 5 the corrugated shape of the valves 46 and 47 cause certain alternate portions to be reentrant with respect to other alternate portions. In the species of Figs. 6 and 7 the scalloped outer peripheries of the valves 48 and 49 may be considered to be reentrant in form.

I claim:

1. A valve construction comprising a valve body having a plurality of passages extending therethrough from one face to another face, a first valve member having seating portions raised with respect to other portions and positioned at the said one face of the valve body for causing the seating portions to close certain passages by covering engagement therewith and the other portions to leave open the remaining passages by being spaced therefrom although in covering relation, means yieldingly maintaining the first valve member in the above described relation with respect to the said one face of the valve body, a second valve member having seating portions raised with respect to other portions and positioned at the said other face of the valve body for causing the seating portions to close the said remaining passages by covering engagement therewith and the other portions to leave open the said certain passages by being spaced therefrom although in covering relation, and means yieldingly maintaining the second valve member in the above described relation with respect to the said other face of the valve body.

2. A valve construction comprising a valve body having a ring of passages extending from one face to another face, a first valve ring having seating portions elevated with respect to other portions intermediate the seating portions and positioned at the said one face of the valve body for causing the seating portions to close alternate passages by covering engagement therewith and the other portions to leave open the remaining alternate passages by being spaced therefrom although having covering relation with respect thereto, means yieldingly holding the first valve ring in the above described position, a second valve ring having seating portions elevated with respect to other portions intermediate the seating portions and positioned at the said other face of the valve body for causing the seating portions to close the said remaining alternate passages by covering engagement therewith and the other portions to leave open the alternate passages by being spaced therefrom although having covering relation with respect thereto, and means yieldingly maintaining the second valve ring in the above described position.

3. The valve construction specified in claim 2, each valve ring being thicker at the seating portions than at the other portions so as to cause the opposite side of the valve ring to be smooth.

4. The valve construction specified in claim 2, each valve ring being corrugated.

5. A valve construction comprising a valve body having a plurality of parallel passages arranged in a circle and extending through the body from one face to another face, a first circular valve ring having seat portions elevated with respect to other portions spacing the seat portions from one another and positioned at the said one face so as to cause the seat portions to close alternate passages by engaging the said one face at the said alternate passages and to cause the other portions to leave open the remaining alternate passages by being spaced from the said one face at the said remaining alternate passages, means yieldingly maintaining the above described position of the first valve ring, a second circular valve ring having seat portions elevated with respect to other portions spacing the seat portions from one another and positioned at the said other face of the valve body so as to cause the seat portions to close the said remaining alternate passages by engaging the said other face at the said remaining alternate passages and to cause the other portions to leave open the said alternate passages by being spaced from the said other face at the said alternate passages, and means resiliently holding the second valve ring in the above described position.

6. A valve construction comprising a valve body having a plurality of passages extending therethrough from one face to another face and arranged in a closed path, a first valve member having a reentrant contour deviating from the path of the passages and positioned at the said one face so as to close certain passages and to leave open the remaining passages, means yieldingly holding the first valve member in the above described position, a second valve member having a reentrant contour deviating from the path of the passages and positioned at the said other face so as to close the said remaining passages and to leave open the said certain passages, and means yieldingly holding the second valve member in the above described position.

7. A valve construction comprising a valve body having a plurality of passages extending therethrough from one face to another face and arranged in a ring, a first valve of annular form with inner and outer peripheries and being positioned at the said one face of the valve body, one periphery being scalloped so as to cause the first valve to close certain passages and to leave open the remaining passages, means resiliently holding the first valve in the above described position, a second valve of annular form with inner and outer peripheries and being positioned at the said other face of the valve body, one periphery being scalloped so as to cause the second valve to close the said remaining passages and to leave open the said certain passages, and means resiliently holding the second valve in the above described position.

8. A valve construction comprising a valve body having a plurality of parallel passages extending therethrough from one face to another face and arranged in a circle, a first valve ring positioned at the said one face of the valve body and having a scalloped outer periphery causing the first valve ring to close certain passages and to leave open the remaining passages, means resiliently holding the first valve ring in the above described position, a second valve ring positioned at the said other face of the valve body and having a scalloped outer periphery causing the second valve ring to close the said remaining passages and to leave open the said certain passages, and means resiliently holding the second valve ring in the above described position.

9. A valve construction comprising a valve body having a plurality of passages extending therethrough from one face to another face, a first valve member positioned at the said one face of the valve body and having reentrant portions causing positioning of the first valve member at the said one face to close certain passages and to leave open the remaining passages, means yieldingly maintaining the first valve member in the aforesaid position, a second valve member positioned at the said other face of the valve body and having reentrant portions causing positioning of the second valve member at the said other face to close the said remaining passages and to leave open the said certain passages, and means yieldingly maintaining the second valve member in the aforesaid position.

10. A piston valve construction for a shock absorber comprising a piston having a body portion, peripheral skirts extending from opposite faces thereof, central hub extensions at the opposite faces, and a ring of passages extending from one opposite face to the other opposite face, a first valve ring positioned at the said one face of the piston in surrounding relation to one hub extension and having reentrant portions causing positioning of the first valve ring at the said one face to close certain alternate passages and to leave open the remaining alternate passages, means yieldingly maintaining the first valve ring in the aforesaid position, means preventing substantial rotative movement of the first valve ring with respect to the piston, a second valve ring positioned at the said other face of the piston in surrounding relation to the other hub extension and having reentrant portions causing positioning of the second valve ring at the said other face to close the said remaining alternate passages and to leave open the said certain alternate passages, means resiliently maintaining the second valve ring in the aforesaid position, and means preventing substantial rotative movement of the second valve ring with respect to the piston.

11. The piston valve construction specified in claim 10, the reentrant portions of each valve ring involving a scalloped periphery.

12. The piston valve construction specified in claim 10, each valve ring having seat portions closing those passages closed by the particular valve ring and being elevated with respect to portions intermediate the seating portions so as to cause the intermediate portion to be the reentrant portions specified in claim 10, these seating portions and intermediate portions constituting one face of the particular valve ring, the other face being continuously flat.

13. The piston valve construction specified in claim 10, each valve ring having seating portions closing those passages closed by the particular valve ring and being elevated with respect to portions intermediate the seating portions so as to cause the intermediate portion to be the reentrant portions specified in claim 10, each ring being corrugated.

14. A piston valve construction for a shock absorber comprising a piston having a ring of passages extending from one opposite face to the other opposite face, a first valve ring yieldingly engaging the said one face of the piston and having reentrant portions closing certain alternate passages and leaving open the remaining alternate passages, means preventing substantial rotative movement of the first valve ring with respect to the piston, a second valve ring yieldingly engaging the said other face of the piston and having reentrant portions closing the said remaining alternate passages and leaving open the said certain alternate passages, and means preventing substantial rotative movement of the second valve ring with respect to the piston.

15. The piston valve construction specified in claim 14, the reentrant portions of each valve ring involving a scalloped periphery.

16. The piston valve construction specified in claim 14, each valve ring having seating portions closing those passages closed by the particular valve ring and being elevated with respect to portions intermediate the seating portions so as to cause the intermediate portion to be the reentrant portions specified in claim 14, these seating portions and intermediate portions constituting one face of the particular valve ring, the other face being continuously flat.

17. The piston valve construction specified in claim 14, each valve ring having seating portions closing those passages closed by the particular valve ring and being elevated with respect to portions intermediate the seating portions so as to cause the intermediate portion to be the reentrant portions specified in claim 14, each ring being corrugated.

SIDNEY A. OCHS.

REFERENCES CITED

The following references are of record in the file of this patent:

UNITED STATES PATENTS

| Number | Name | Date |
|---|---|---|
| 947,536 | Wenkel | Jan. 25, 1910 |
| 2,159,289 | Nickelsen | May 23, 1939 |
| 2,316,924 | Whisler | Apr. 20, 1943 |
| 2,324,058 | Boor et al. | July 13, 1943 |

FOREIGN PATENTS

| Number | Country | Date |
|---|---|---|
| 506,687 | Great Britain | June 2, 1934 |